(12) United States Patent
Pichereau

(10) Patent No.: US 8,438,980 B2
(45) Date of Patent: May 14, 2013

(54) LOADING AND UNLOADING DEVICE FOR HANDLING TROLLEY

(75) Inventor: Olivier Pichereau, Saint Aubin (FR)

(73) Assignee: Valeo Systemes Thermiques, Le Mesnil, Saint Denis (FR)

( * ) Notice: Subject to any disclaimer, the term of this patent is extended or adjusted under 35 U.S.C. 154(b) by 132 days.

(21) Appl. No.: 12/742,825

(22) PCT Filed: Nov. 6, 2008

(86) PCT No.: PCT/EP2008/065091
§ 371 (c)(1),
(2), (4) Date: Sep. 8, 2010

(87) PCT Pub. No.: WO2009/062885
PCT Pub. Date: May 22, 2009

(65) Prior Publication Data
US 2011/0005433 A1    Jan. 13, 2011

(30) Foreign Application Priority Data
Nov. 13, 2007 (FR) .................................... 07 07958

(51) Int. Cl.
*B65D 19/12* (2006.01)
(52) U.S. Cl.
USPC ........................................ 108/56.1; 108/55.5

(58) Field of Classification Search ............... 108/51.11, 108/53.1, 53.3, 53.5, 55.1, 55.3, 55.5, 57.2, 108/57.25, 57.28, 56.1; 292/241
See application file for complete search history.

(56) References Cited

U.S. PATENT DOCUMENTS

| 584,343 A | * | 6/1897 | Froelich | 292/103 |
| 2,721,756 A | * | 10/1955 | Markussen | 294/67.4 |

(Continued)

FOREIGN PATENT DOCUMENTS

| DE | 29615066 U1 | 11/1996 |
| DE | 19910528 A1 | 9/2000 |

(Continued)

OTHER PUBLICATIONS

English language abstract for DE 29615066 extracted from espacenet.com database dated Jul. 20, 2010, 9 pages.

(Continued)

*Primary Examiner* — Jose V Chen
*Assistant Examiner* — Matthew Ing
(74) *Attorney, Agent, or Firm* — Howard & Howard Attorneys PLLC

(57) ABSTRACT

A loading and unloading device includes a removable base (10) having dimensions adapted to those of the loading bed (26) of a handling trolley (62), the base having a generally planar upper face (12) for receiving goods (32) and being surrounded by a peripheral edge (14) for retaining the goods (32), a lower face (16) shaped so as to maintain the base (10) on the loading bed (26) of the trolley (62), and four side faces (18) connecting the upper face (14) and the lower face (16).

17 Claims, 8 Drawing Sheets

U.S. PATENT DOCUMENTS

| | | | |
|---|---|---|---|
| 4,478,156 A | | 10/1984 | Andersson |
| D283,267 S | * | 4/1986 | Kero et al. .................... D34/38 |
| 4,829,909 A | * | 5/1989 | Mandel ........................ 108/55.5 |
| 5,105,746 A | * | 4/1992 | Reynolds .................... 108/56.1 |
| 5,758,771 A | * | 6/1998 | Rose ............................ 206/386 |
| 6,234,087 B1 | * | 5/2001 | Brown ......................... 108/56.1 |
| 6,543,990 B2 | * | 4/2003 | Heil ............................. 414/799 |
| 6,718,887 B1 | * | 4/2004 | Cook, Sr. .................... 108/53.3 |
| 6,874,807 B1 | | 4/2005 | Labadie et al. |
| 2007/0131148 A1 | * | 6/2007 | Wu ........................... 108/57.25 |
| 2007/0283857 A1 | * | 12/2007 | Dong ........................ 108/51.11 |

FOREIGN PATENT DOCUMENTS

| | | |
|---|---|---|
| DE | 202006001482 U1 | 4/2006 |
| EP | 0456529 A1 | 11/1991 |
| EP | 1227945 B1 | 1/2006 |
| FR | 2508005 A1 | 12/1982 |
| FR | 2826330 A1 | 12/2002 |
| GB | 2378680 A | 2/2003 |
| JP | 05116709 * | 5/1993 |

OTHER PUBLICATIONS

English language abstract for DE 19910528 extracted from espacenet.com database dated Jul. 20, 2010, 7 pages.

English language abstract for DE202006001482 extracted from espacenet.com database, dated Jul. 20, 2010, 14 pages.

English language abstract for EP 0456529 extracted from espacenet.com database, dated Jul. 20, 2010, 11 pages.

English language abstract for EP 1227945 extracted from espacenet.com database, dated Jul. 20, 2010, 11 pages.

English language abstract for FR 2508005 extracted from espacenet.com database, dated Jul. 20, 2010, 14 pages.

English language abstract for FR 2826330 extracted from espacenet.com database, dated Jul. 20, 2010, 17 pages.

PCT International Search Report for PCT/EP2008/065091, dated Feb. 12, 2009, 3 pages.

* cited by examiner

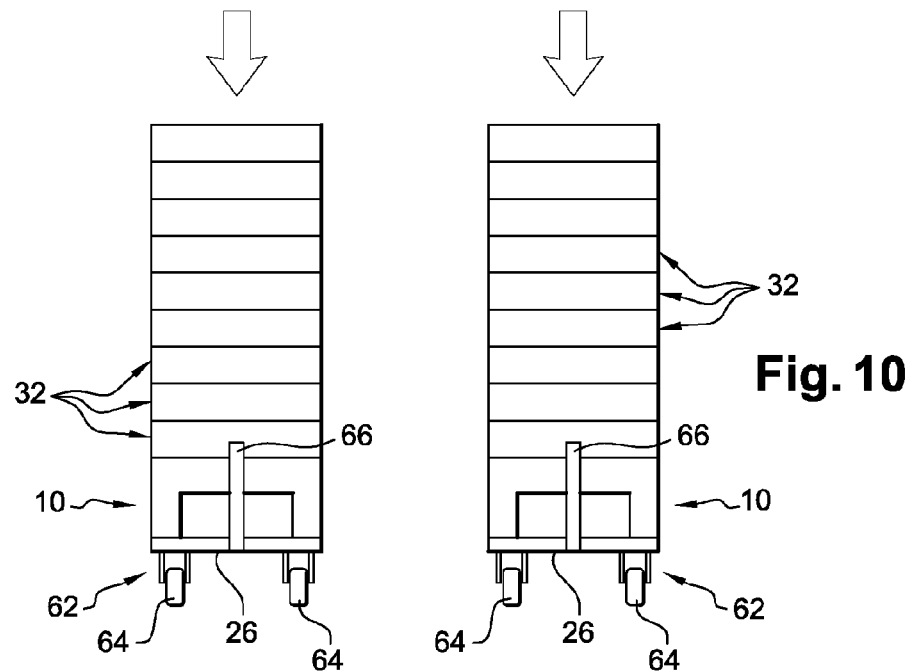
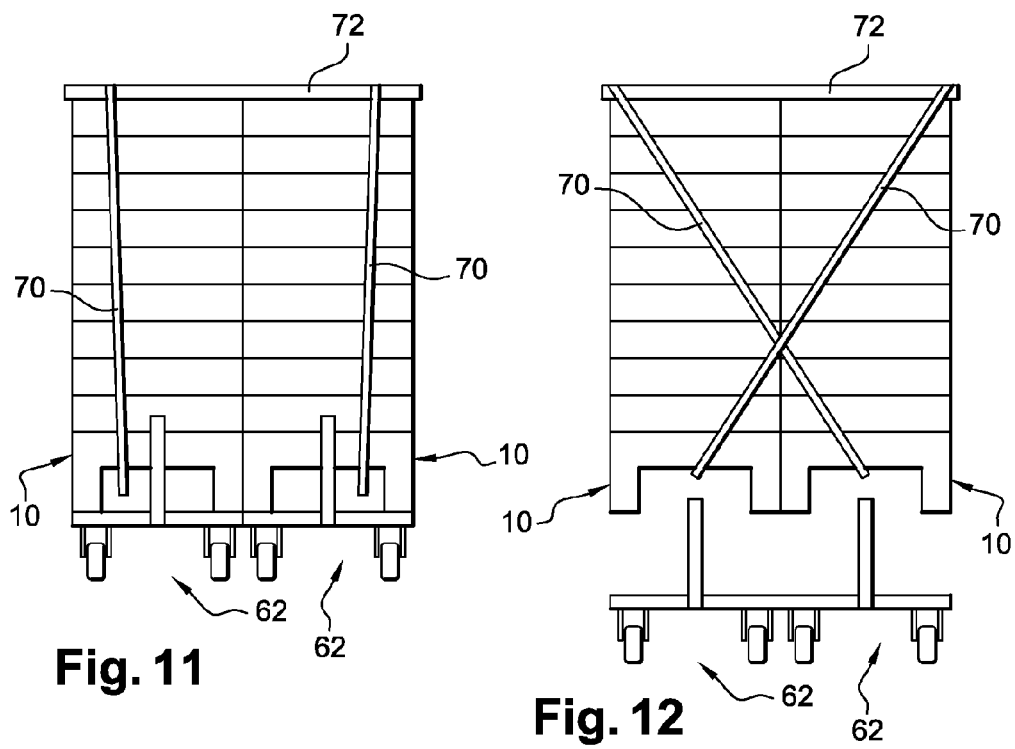

US 8,438,980 B2

LOADING AND UNLOADING DEVICE FOR HANDLING TROLLEY

RELATED APPLICATIONS

This application claims priority to and all the advantages of International Patent Application No. PCT/EP2008/065091, filed on Nov. 6, 2008, which claims priority to French Patent Application No. FR 07/07958, filed on Nov. 13, 2007.

The invention relates to the field of materials handling and relates more specifically to a loading and unloading device for an industrial truck.

In the field of materials handling, it is known to use pallets of standardized sizes on which goods are stored, for example, cardboard boxes or storage bins that themselves contain articles. A pallet can thus be used to group together a certain number of goods that are stored and/or transported together.

The loading of goods on a pallet is an operation called "palletization", while the unloading of goods from a pallet is an operation called "depalletization". These two operations are very often time-consuming and tedious and require significant time and labor.

The pallets and goods that they receive are usually manipulated by lift trucks in order to be loaded on the platform of a truck and then unloaded into a temporary warehouse area.

In such a temporary warehouse area, constituting a storage area, the goods can remain on the pallet and be unloaded as necessary.

However, it is often necessary to unload goods from the pallet on which they were transported in order to be placed on smaller industrial trucks than a standardized pallet, which will be used to transport the goods to their destination site.

These can be, for example, industrial trucks of the type described in EP 1 227 945, which, due to their excellent maneuverability, can reach areas with reduced or difficult accessibility.

Such trucks can be used, for example, to route various containers, such as, for example, storage bins, cardboard boxes or cases, containing parts intended for production sites, such as assembly lines used in manufacturing plants.

These trucks generally have a loading platform of reduced size with respect to that of a pallet, typically a rectangle of around 600 mm×400 mm, with these dimensions being provided purely as an indication, noting that pallet dimensions are generally 1200 mm×1000 mm for the largest pallets.

The loading of containers (for example storage bins or cardboard boxes) from a pallet onto the platform of an industrial truck is usually performed by hand, optionally with the assistance of a tool such as a hook, by arranging the containers in one or more stacks, directly on the platform of the truck. The same is true of the reverse operation of unloading, when the containers are unloaded from the platform of an industrial truck so as to be loaded onto a pallet.

Thus, each time there is the need for an intermediate transfer operation, either from the industrial truck to the pallet, or, inversely, from the pallet to the industrial truck, which requires significant time and labor. Such a handling operation is laborious work for the operator in charge of it.

The invention is essentially intended to simplify the loading and unloading operations, by removing this intermediate transfer operation.

The invention thus proposes a loading and unloading device for an industrial truck comprising a loading platform.

According to the invention, the device includes a removable base, for example with a general rectangular contour, and dimensions matching those of the loading platform of the truck, in which said base has a generally planar upper face capable of receiving goods and surrounded by a peripheral border for holding the goods, a lower face designed to hold the base on the loading platform of the truck and four lateral faces connecting the upper face and the lower face.

Thus, the "palletization" and "depalletization" operations that have been necessary until now can be eliminated owing to the fact that the base can be placed directly on the loading platform of the industrial truck, and, inversely, be removed from the loading platform with the goods that it is transporting. As these bases will usually be smaller than the pallets, it will be possible, by careful sizing of the bases with respect to the pallets, to group together, for example, two bases side-by-side or, inversely, to separate two bases previously grouped together.

For this, it is advantageous for the base to be equipped with locking members arranged respectively along two adjacent lateral faces in order to associate said base with at least one adjacent base.

In the following description, containing solely non-limiting examples of embodiments, reference is made to the appended drawings, in which.

Figure 8:
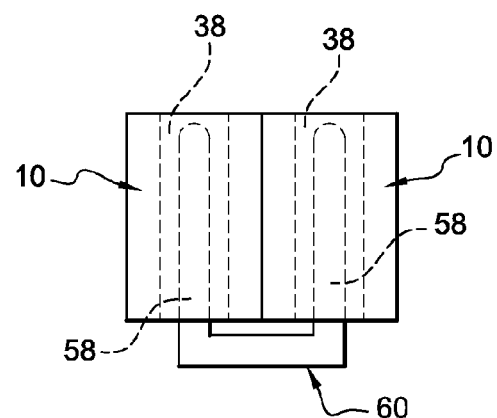
Figure 9:
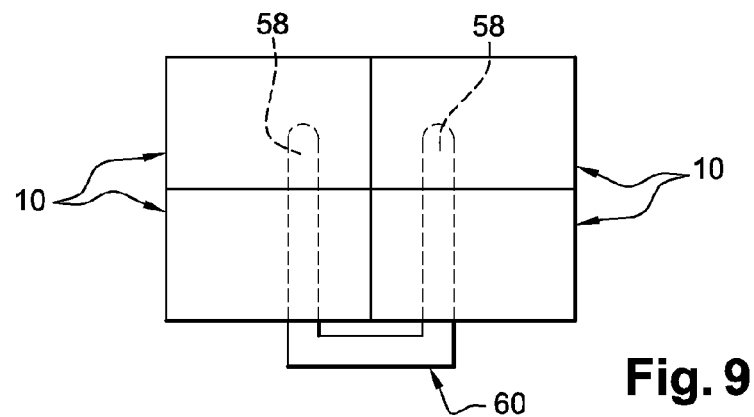
Figure 13:
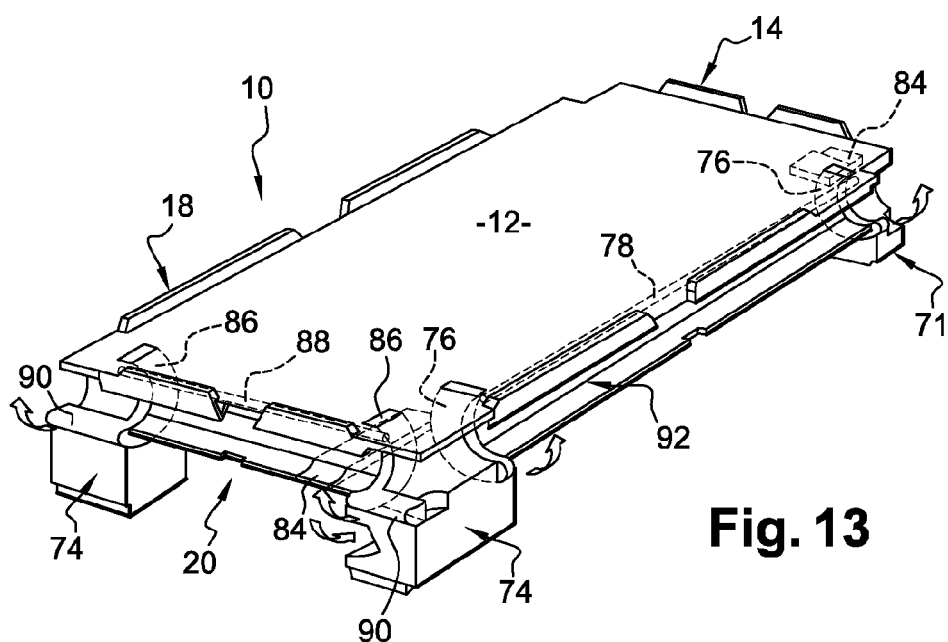
Figure 14:
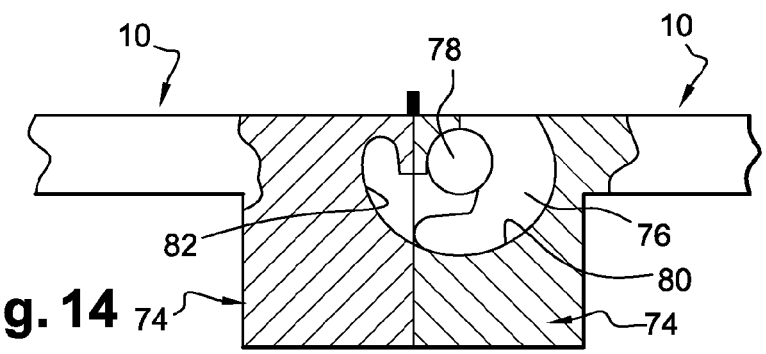
Figure 15:
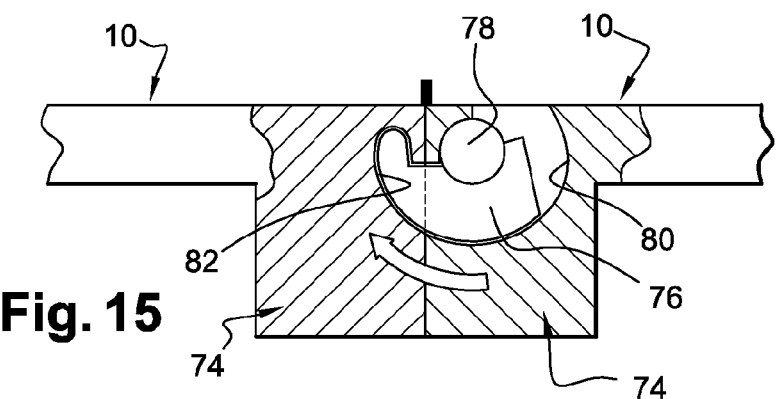
Figure 16:
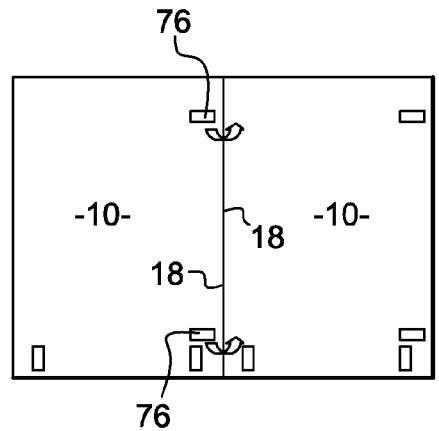
Figure 17:
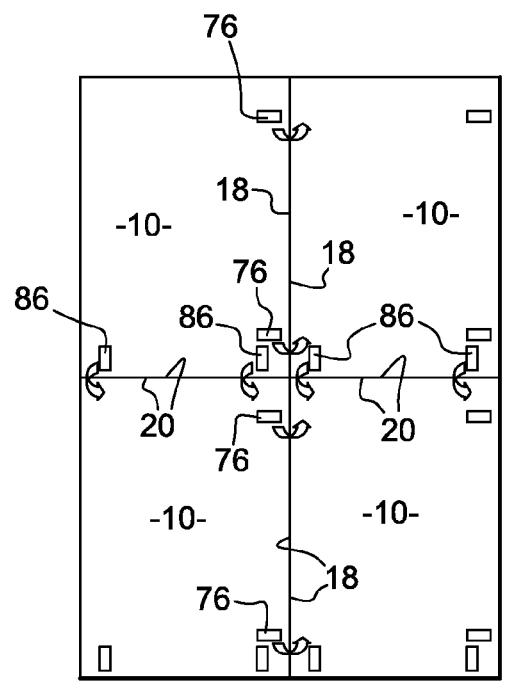
Figure 18:
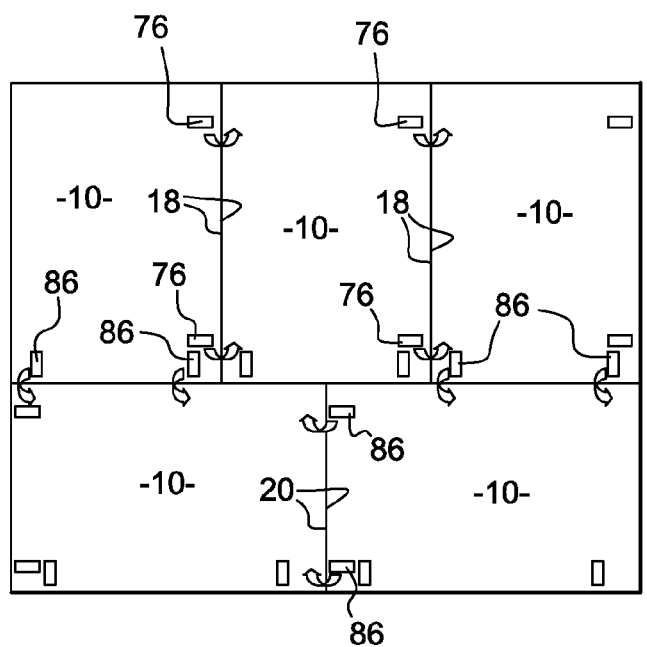
Figure 19:
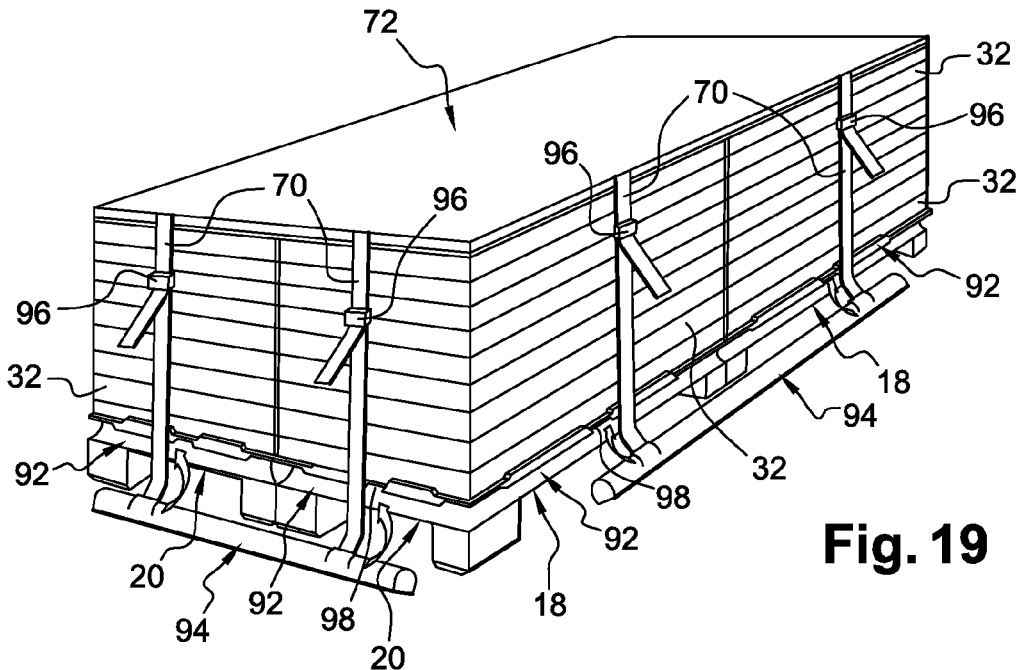
Figure 20:
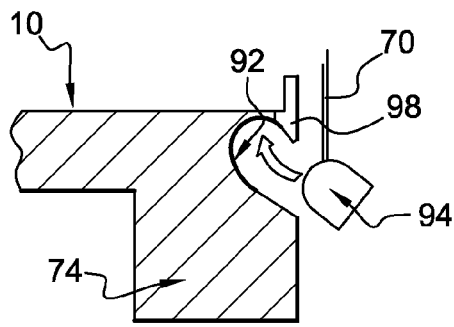
Figure 21:
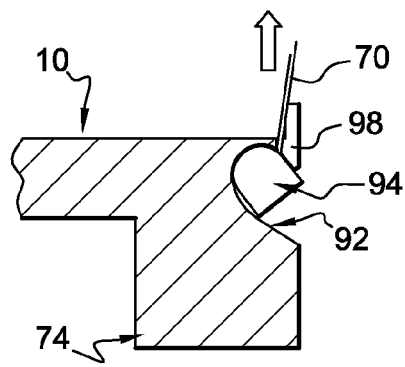
Figure 22:
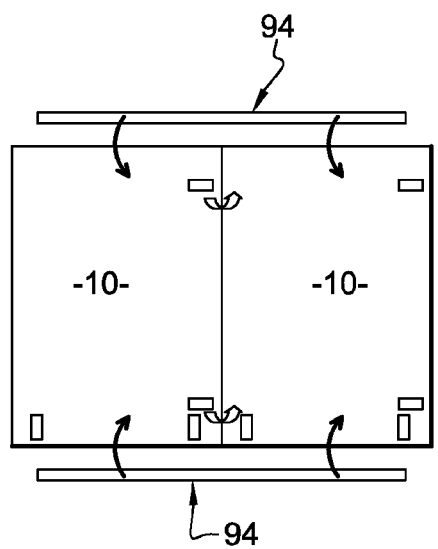
Figure 23:
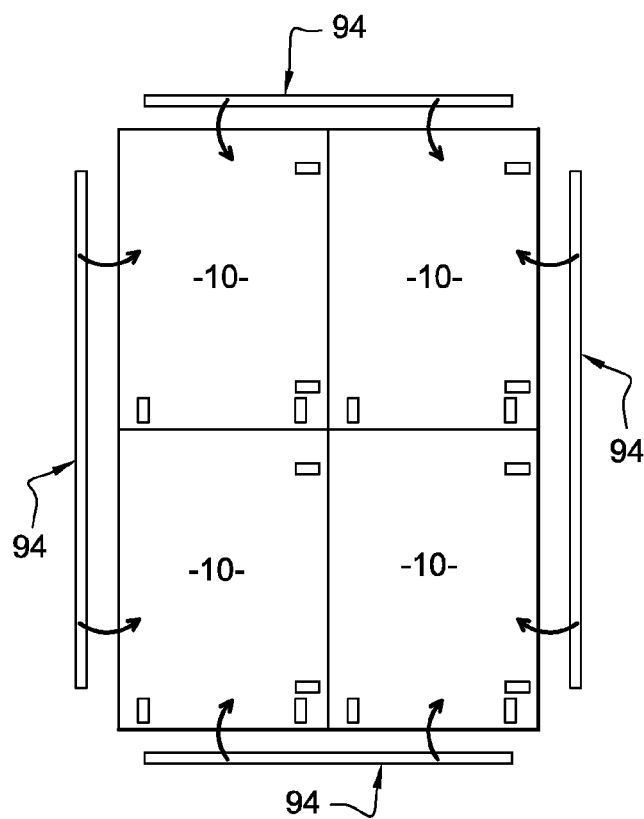

FIG. 8 diagrammatically shows, in a plan view, the arrangement of two bases juxtaposed and the manipulation thereof by the fork of a lift truck;

FIG. 9 is a plan view showing the juxtaposition of four bases according to the invention and the manipulation thereof by the fork of a lift truck;

FIGS. 10 to 12 show three successive manipulation steps with two industrial trucks each holding goods by means of a base according to the invention;

FIG. 13 is a perspective view of a base equipped with locking members, according to another embodiment of the invention;

FIG. 14 is a partial cross-section view of two adjacent bases according to FIG. 13, before the locking thereof;

FIG. 15 is a view analogous to that of FIG. 14 after locking;

FIGS. 16, 17 and 18 show, in a top view, the juxtaposition of two bases, the juxtaposition of four bases, and the juxtaposition of five bases according to FIG. 13, in which these bases are joined and secured by their locking means;

FIG. 19 is a perspective view of four bases according to FIG. 13, arranged adjacently and on which goods are arranged, contained by a cover and by straps joined by link rods;

FIG. 20 is a partial cross-section view of a base according to FIG. 19 before engagement of the link rod;

FIG. 21 is a view analogous to FIG. 20 after engagement of the link rod in order to tighten the straps; and FIGS. 22 and 23 respectively show the use of two link rods for two adjacent bases and the use of four link rods for four adjacent bases.

Figure 1:
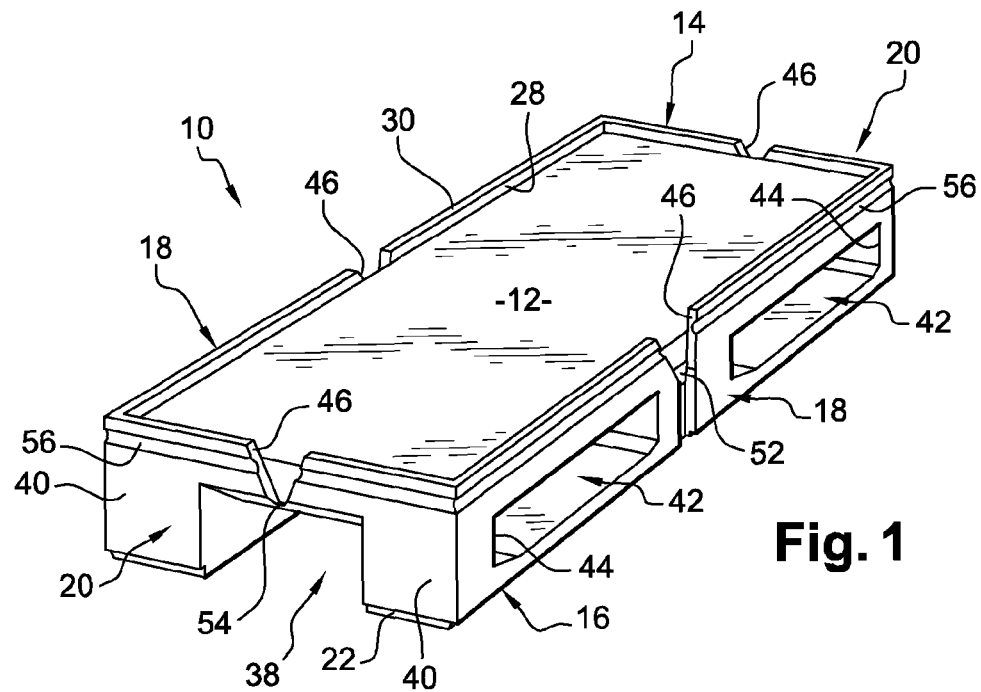
FIG. 1 is a perspective view of a loading and unloading device according to the invention, produced in the form of a removable base.

Reference is first made to FIG. 1, which shows a loading and unloading device intended for an industrial truck comprising a loading platform.

The device of the invention includes a removable base 10 with a general rectangular contour having a generally planar upper rectangular face 12, capable of receiving objects (not shown), for example one or more stacks of goods with a parallelepiped shape (not shown), in particular cardboard boxes or storage bins containing articles. This upper face 12 is surrounded by a peripheral border 14 serving in particular to hold the goods arranged on the base. The base 10 also includes a lower face 16 designed to hold the base on the loading platform 26 (not shown) of the truck 62, as well as four lateral faces 18 and 20 connecting the upper face 12 and the lower face 16. In the example, these lateral faces 18 and 20 include two opposite large lateral faces 18 connected to large sides of the upper face, and two opposite small lateral faces 20 connected to small sides of the upper face 12.

The perspective view of FIG. 1 fully shows one of the large lateral faces 18 and one of the small lateral faces 20. The two opposite faces, not visible in FIG. 1, have the same configuration.

In its lower portion, the base 10 includes a peripheral groove 22 formed at the junction of the lower face 16 and the four lateral faces 18 and 20. This groove 22 is tapered so as to facilitate the fitting thereof.

Figure 5:
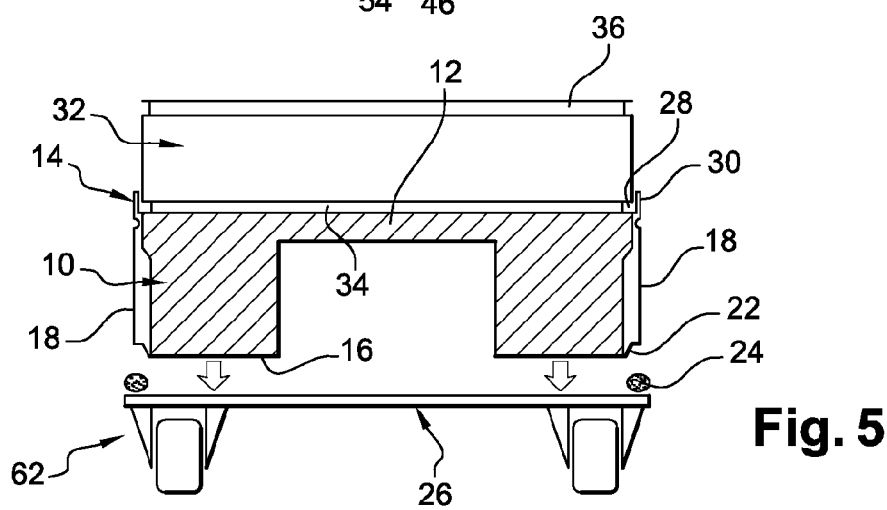
FIG. 5 is a cross-section view of a base on the upper face of which a bin is arranged right-side up, in which the base is shown during installation on the loading platform of an industrial truck.

As can be seen in FIG. 5, this peripheral groove 22 forms a recess and is sized so as to fit into a rectangular peripheral frame 24 of the loading platform 26 of an industrial truck 62 in order to position and hold the base 10 on the peripheral frame 24. In other words, the base 10 can be fitted by a vertical downward movement into the frame 24, and, inversely, be removed from this frame by a vertical upward movement. Thus, by a simple fitting movement, the base 10 is perfectly positioned and held on the loading platform 26 of the truck 62 in a suitable position.

This peripheral groove 22 can also be used to stack bases 10 one on top of another. Indeed, the peripheral groove 22 of a first base 10 is capable of being fitted into the peripheral border 14 of a second base 10 located immediately below the first base in a stack of superimposed bases 10. Thus, the groove 22 has a dual function: that of enabling the base 10 to be positioned on the peripheral frame 24 of a loading platform 26 and that of enabling stacking or superimposing of bases 10 in a defined position.

Figure 6:
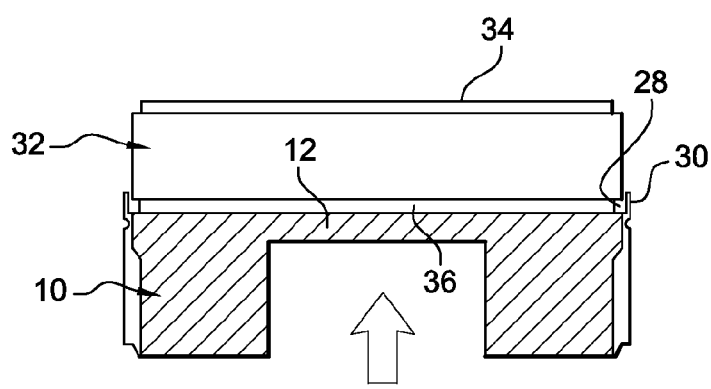
FIG. 6 is a cross-section view similar to that of FIG. 5, showing a bin arranged upside-down, on the upper face of the base, without the industrial truck.

The peripheral border 14 projects above the upper face 12 and extends the lateral faces 18 and 20. This peripheral border 14 includes an internal face 28 that is perpendicularly connected to the upper face 12 of the base 10 and an upper edge 30 that connects the internal face 28 to the lateral faces 18 and 20 (FIG. 1). The peripheral border 14 also serves to hold one or more stacks of goods. Thus, as can be seen in FIG. 5, a storage bin 32 arranged right-side up rests on the upper face 12 by being held by the internal face 28. It is therefore the base 34 of the storage bin 32 that rests on this upper face 12. This bin 32 also comprises a periphery projecting 36 at the upper portion. The storage bin 32 can also be arranged upside-down on the upper face 12 of the base 10 as shown in FIG. 6. In this case, the periphery 36 of the storage bin 32, which is then facing downward, is held by the internal face 28 of the peripheral border 14.

Figure 2:
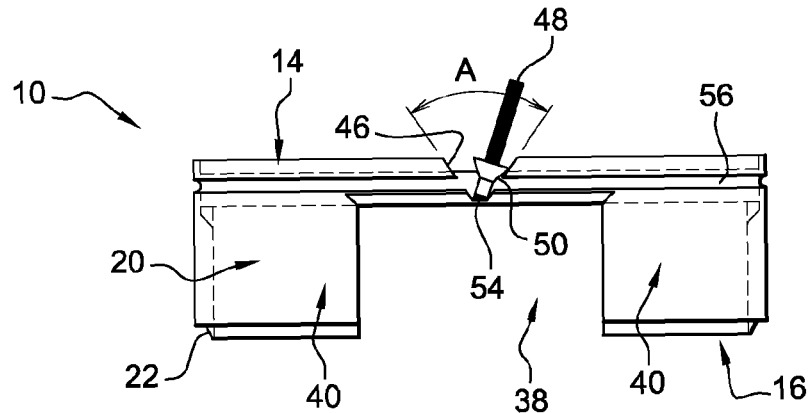
FIG. 2 is a side view showing a small lateral face of the base of FIG. 1.

As can be seen in FIGS. 1 and 2, a longitudinal passage 38, designed in particular for the insertion of an arm of a fork of a lift truck, leads into the two small lateral faces 20. In the example, this longitudinal passage 38 is made in the form of a tunnel which leads over its entire length to the lower face 16, and which is delimited between two general parallelepiped longitudinal base elements 40 of the base 10. These two base elements 40 constitute two massive blocks that extend in the longitudinal direction of the base 10 and that are connected respectively to the two large lateral faces 18. Thus, the two small lateral faces 20 are interrupted in their central portion by the longitudinal passage 38. The latter interrupts the peripheral groove 22 in the central region of each of the small lateral walls 20.

Figure 3:
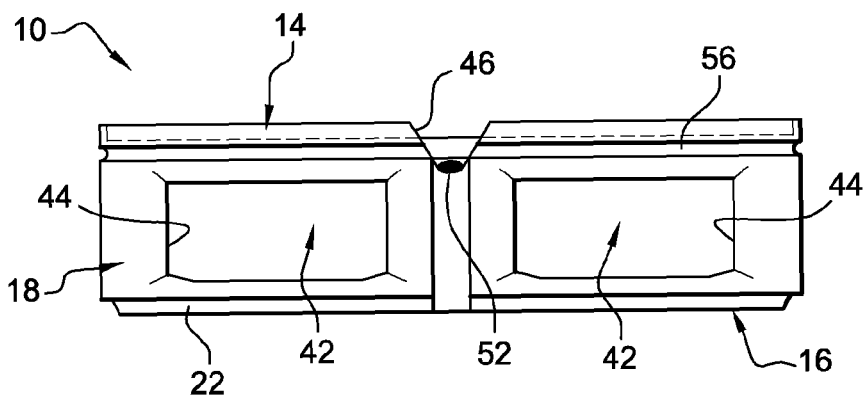
FIG. 3 is a side view showing a large lateral face of the base of FIG. 1.
Figure 4:
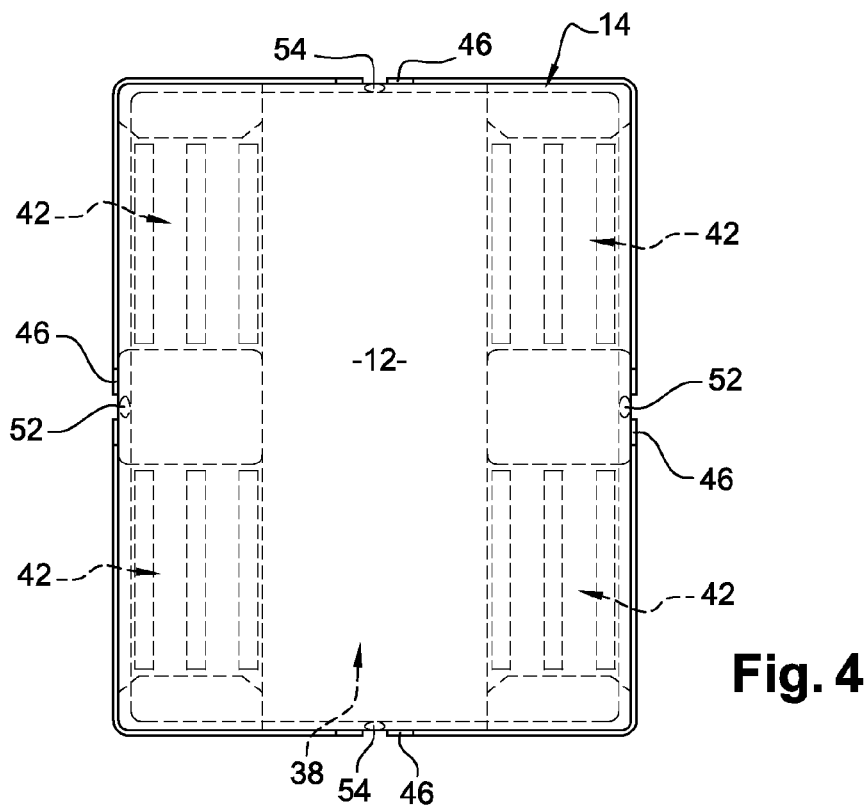
FIG. 4 is a top view of the base of FIGS. 1 to 3.

The base 10 also includes at least one transversal passage 42, designed in particular for the insertion of an arm of a fork of a lift truck, leading into the two large lateral faces (FIGS. 1 and 3).

In the example, the base 10 includes two transversal passages 42 that each lead into the two large lateral faces 18 through respective general rectangular openings 44. Thus, each transversal passage 42 is in fact comprised of two portions that respectively pass through the two bases 40.

In addition, the base includes four recesses 46 (FIGS. 1, 2, 3 and 4) formed respectively in the four lateral faces (the two large faces 18 and the two small faces 20) so as to enable the passage of fastening straps 48. A fastening strap 48 is partially shown in FIG. 2. It ends with a hook 50 that cooperates with the base 10, as will be seen later.

In the example, each of the recesses 46 leads upward into the peripheral border 14, which is therefore locally interrupted in its thickness, and downward into an attachment hole 54 for each of the small lateral faces 20. The hole 52 of a large lateral face 18 leads into a central portion of this large face 18 between the two openings 44. In addition, the attachment hole 54 of each of the small lateral faces 20 leads into a central portion of this small face 20 near the upper portion of the passage 38.

As shown in particular in FIG. 2, each of the recesses 46 has a flared shape from the attachment hole 52 or 54 of the corresponding lateral face 18 or 20 in the direction of the peripheral border 14.

These recesses 46 enable the passage of a fastening strap 48 and a hook 50, thus preventing said strap and said hook from going beyond the peripheral line of the base 10, protecting them from accidental impact, and thus preventing accidental disengagement. Moreover, as these recesses 46 have a flared shape, they enable the strap to adopt different positions within an angular interval A, which can, for example, be on the order of 90° (FIG. 2). This therefore enables a straight or oblique positioning of the strap 48 according to the desired use.

Figure 7:
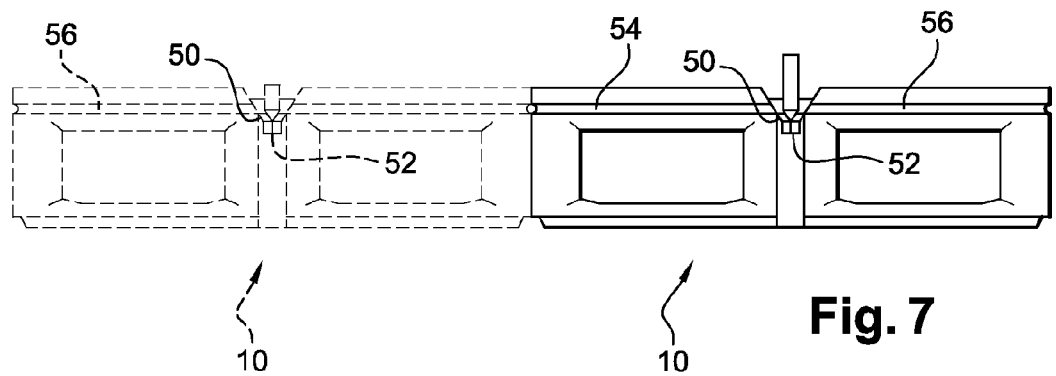
FIG. 7 is a side view showing the large lateral faces of two bases juxtaposed in a horizontal plane.

When two bases are arranged one next to the other by juxtaposition of two large lateral faces 18, in the same horizontal plane, it is possible to engage two hooks 50 in the respective attachment holes 52 of the two bases 10 (FIG. 7). Advantageously, a link rod 54 that joins the two hooks 50 is then provided. It is advantageous for this link rod 54 to be retracted into the respective bases. For this reason, each base 10 has a continuous peripheral groove 56 formed on the four lateral faces 18 and 20 below the peripheral border 14.

As already indicated, the bases 10 and the stacks of goods 32 that they hold (cardboard boxes, storage bins, et.) can be manipulated individually or grouped together by two or by four and then be separated if necessary.

FIG. 8 diagrammatically shows how two bases 10 can be arranged side-by-side by juxtaposing two of their large lateral faces 18. In this position, the two respective longitudinal passages 38 of two bases enable two arms 58 of the fork 60 of a lift truck (not shown) to be inserted.

It is also possible to group four bases together as shown in FIG. 9. In this case, the two arms 58 of a fork 60 can be inserted into the respective transversal passages 42 of the bases.

The bases of the invention can be made in different sizes. In a preferred embodiment, this base has a general rectangular shape with dimensions of around 600 mm×400 mm and with a height of around 150 mm.

The base is advantageously formed in a single part by molding a plastic material. This molding can be performed by injection with a suitable plastic material. Examples of plastic material include polypropylene, high-density polyethylene (HDPE), ABS, and so on.

The dimensions of 600 mm×400 mm indicated above constitute a preferred example that enables the base 10 to fit on a loading platform 26 with the same dimensions. This also enables standard bins to be received.

Thus, the base can receive bins with dimensions of 400 mm×600 mm. It can also receive two stacks of bins each having dimensions of 300 mm×400 mm, or four stacks of bins each having dimensions of 200 mm×300 mm. Of course, these dimensions are provided here as examples.

Reference will now be made to FIGS. 10 to 12 in order to describe the use of a base 10 according to the invention.

In FIG. 10, two bases 10 are arranged respectively on the respective loading platforms 26 of two industrial trucks 62. These two trucks can, for example, be of the type described in document EP 1 227 945 mentioned earlier. These trucks 62 have four wheels 64 and a tiller 66 to enable a truck to be hitched either to a preceding truck in a line of trucks or to a suitable tractor. In the example, each of the bases 10 holds a vertical stack of a plurality of goods 32, in this case bins analogous to those described above in reference to FIGS. 5 and 6.

To begin (FIG. 10), the two trucks 62 are completely independent and hold respective stacks of bins 32. In a next step (FIG. 11), the two trucks are brought together, and a common cover 72 and respective straps 70 covering the assembly are positioned. In the next step (FIG. 12), the two bases 10 and their respective stacks of bins 32 are secured together by means of the common cover 72 and the fastening straps 70 arranged in the oblique position.

The assembly thus obtained can be lifted from the two trucks as shown in FIG. 12 by means of a suitable lifting device (not shown) so as, for example, to be arranged on the loading platform of an truck or the like. Inversely, when starting with two stacks of bins joined together and arranged on two bases, it is possible to then separate the two bases according to inverse operations.

Of course, this can be extended to more than two bases, for example four bases in the configuration presented earlier in FIG. 9.

Reference is now made to FIG. 13, which shows a base 10 analogous to that of FIG. 1, in which common elements are designated by the same references. The base 10 is in this case equipped with four end feet 74, each consisting of a block with a general parallelepiped shape.

The base 10 of FIG. 13 is equipped with locking members arranged respectively along a large lateral face 18 and along an adjacent small lateral face 20 so as to enable said base to be associated with at least one adjacent base, in order to join them and secure them.

The locking members arranged along the large face 18 include two hooks 76 spaced apart from one another and secured by a common pivot pin 78, which extends parallel to the direction of the large face 18. Each of the hooks 76 has the general shape of a C and is arranged in a recess 80 provided in an end foot 74 of the base as shown in FIG. 14. The end of the hook 76 is intended to be engaged in a corresponding recess 82 of the end foot 74 of an adjacent base 10, as shown in FIG. 14. In FIG. 14, the hook 76 is in a retracted position (unlocking position) in which it is retracted into the recess 80. The hook 76 can be brought to an extended position (locking position), as shown in FIG. 15, by rotating it about one-quarter turn, as shown by the arrow, in this case in the clockwise direction. In the extended position, the end of the hook projects from the end foot 74 and is fully engaged in the recess 82, thereby enabling the base 10 to be locked with an adjacent base 10.

The pivot pin 78 has at least one end lever 84, according to the example shown, two levers 84, capable of being actuated so as to move the locking member, i.e. the two hooks 76, from one to the other of the retracted position and the extended position. These levers 84 project at the two ends of the large lateral face 18, i.e. respectively onto the adjacent two small lateral faces 20. These levers can thus be actuated by a user's foot from one or the other of the two small lateral faces 20.

The base 10 of FIG. 13 analogously includes locking members arranged along one of the small faces 20. These members include two hooks 86 spaced apart from one another and secured by a common pivot pin 88, and capable of being moved between a retraced position and an extended position like the hooks 76. In this embodiment, the pivot pin 88 extends in the direction of the aforementioned small lateral face 20. The pivot pin 88 has, at its two ends, two levers 90 capable of being actuated so as to move the locking member, i.e. the two hooks 86, from one to the other of the retracted position and the extended position. The actuation of the two hooks 86 is therefore performed from one or the other of the large faces 18 of the base. The levers 90 can also be actuated by a user's foot.

In the embodiment of FIG. 13, the end feet 74 can, according to the circumstances, be assembled on the rest of the base so as to facilitate the assembly of the locking members, i.e. the insertion of the hooks 76 and 86 into their respective recesses 80 and the engagement of the pivot pints 78 and 88 in suitable bearings formed in the base itself.

The embodiment of FIG. 13 respectively has two hooks 76 arranged along the large face 18 and two hooks arranged along the small lateral face 20. However, this invention also covers embodiments including a single hook 76 arranged along the large face 18 and/or a hook 86 arranged along the small lateral face 20. Similarly, bases including three or more hooks 76 and 86 are likewise an integral part of this invention.

In addition, the base of FIG. 13 includes a continuous peripheral groove 92 analogous to the continuous peripheral groove 56 described above.

FIG. 16 diagrammatically shows the assembly of two bases 10 along two adjacent large faces 18 by the hooks 76 of one of the bases.

FIG. 17 shows the assembly of four bases along adjacent large faces 18 or adjacent small faces 20 by respective hooks 76 or 86 as diagrammatically shown.

FIG. 18 shows the assembly of five bases by their respective hooks 76 or 86 to form a rectangular base. Three bases are arranged adjacently along two large lateral faces 18. The other two bases are arranged adjacently along two small lateral faces 20 and are attached to the three aforementioned bases, in a generally perpendicular direction. To form a rectangular assembly, this assumes that each of the large lateral faces has a length corresponding to one and one-half times that of each of the small lateral faces.

As an example, each base can have a general rectangular shape with dimensions of around 600 mm×400 mm, as already indicated. In this case, the assembled bases have the following dimensions: 600 mm×800 mm (FIG. 16), 800 mm×1200 mm (FIGS. 17) and 1000 mm×1200 mm (FIG. 18).

FIG. 19 shows four bases according to FIG. 13 arranged adjacently in a configuration analogous to that of FIG. 17. These bases are assembled to one another by their locking means (not shown in FIG. 19). The bases hold goods 32, for example storage bins, above which a common cover 72 is provided. This cover 72 is held by straps 70 analogous to those described above. Each strap 70 is arranged substantially vertically, with the upper end being attached to the cover 72 and the lower end being attached to a link rod 94 analogous to the one described above. A tightening loop 96 enables the tension of the strap to be ensured.

FIG. 19 shows a link rod 94 connected to two straps 70 and capable of being engaged in the respective aligned grooves 92 of two bases 10 on the side of the small lateral faces 20. The length of the link rod 94 must therefore correspond substantially to twice the length of a small lateral face. In addition, on the side of the large lateral faces 18, another link rod 94 is connected to the cover by two other straps 70. This link rod 94 is received in the respective aligned grooves 92 of two bases 10, on the side of the large faces. This link rod will preferably have a length substantially equal to twice the length of a large lateral face 18.

As shown in FIG. 20, the peripheral groove 92 forms a holding recess for the link rod 94, in which the opening of said recess faces downward. In the example, the top of the recess has a general rounded shape and the cross-section of the link rod has a top with a similar general shape.

When the strap 70 is loose, the link rod 94 can be engaged in the groove 92 by an upward movement as shown by the arrow of FIG. 20. It is then sufficient to produce tension in the straps 10 by tightening the respective loops 96 so as to enable the link rod 94 to engage with the base of the groove 92 as shown in FIG. 1.

The vertical tension exerted by the strap 70 enables the link rod 94 to be held in the aligned grooves 92 of the two adjacent bases. A recess 98 is formed each time at the center of each of the lateral faces 18 and 20 of the base so as to enable the strap 70 to pass, as shown in FIGS. 20 and 21. This assumes that the straps 70 will be arranged each time substantially at the center of the small faces and the large lateral faces of the bases.

FIG. 22 shows the use of two link rods 94 in the case of two adjacent bases 10 in a configuration analogous to that of FIG. 16.

FIG. 23 shows the use of four link rods 94 for four adjacent bases in a configuration analogous to that of FIG. 17.

The link rods 94 described above generally have the same function as the link rods 54, but in this case it is the grooves 92 that, owing to their particular shape, perform their attachment in the bases 10.

The invention thus applies to the handling of goods, in particular cardboard boxes or storage bins used to transport various parts, in particular for industrial production lines.

Of course, the invention is not limited to the embodiments described above and provided solely as examples, and encompasses other alternatives that may be envisaged by a person skilled in the art in the context of this invention, and in particular any combination of the various embodiments described above.

The invention claimed is:

1. A loading and unloading device for an industrial truck (62), said industrial truck (62) including a loading platform (26), said loading and unloading device comprising:
a removable base (10) with dimensions matching those of the loading platform (26) of the truck (62), in which said base (10) has a generally planar upper face (12) capable of receiving goods (32) and surrounded by a peripheral border (14) for holding the goods (32),
a lower face (16) designed to hold said base (10) on the loading platform (26) of the truck (62); and
four lateral faces (18, 20) connecting said upper face (12) and said lower face (16); said lateral faces (18, 20) of said base (10) include two opposite large lateral faces (18) connected to large sides of said upper face (12) and two opposite small lateral faces (20) connected to small sides of said upper face (12);
wherein said base (10) is equipped with locking members (76; 86) arranged respectively along two adjacent lateral faces (18, 20) in order to join said base (10) to at least one adjacent base (10) and wherein each of said locking members (76; 86) includes at least hooks secured to a pivot pin (78; 88) and capable of being moved between a retracted position in which it is retracted into said base (10) and an extended position in which it projects from said base (10) so as to be engaged in a respective recess (82) of an adjacent base (10);
wherein said base (10) also includes a longitudinal passage (38) leading into said two small lateral faces (20), said longitudinal passage (38) is made in the form of a tunnel which leads over its entire length to said lower face (16), and which is delimited between two longitudinal base elements (40) of said base (10), wherein said base elements (40) are connected respectively to said two large lateral faces (18);
wherein said peripheral border (14) includes an internal face (28) that is perpendicularly connected to said upper face (12) of said base (10) and an upper edge (30) that connects said internal face (28) to said lateral faces (18, 20).

2. A loading and unloading device according to claim 1, characterized in that said base (10) includes a peripheral groove (22) formed at a junction of said lower face (16) and said lateral faces (18, 20).

3. A loading and unloading device according to claim 2, characterized in that said peripheral groove (22) is sized so as to fit into a peripheral frame (24) of the loading platform (26) of the truck (62) in order to position and hold said base (10) on the peripheral frame (24).

4. A loading and unloading device according to claim 2, characterized in that said peripheral groove (22) of a first base (10) is capable of being fitted into said peripheral border (14) of a second base (10) located immediately below said first base (10) in a stack of superimposed bases (10).

5. A loading and unloading device according to claim 1, characterized in that said base (10) also includes at least one transversal passage (42) leading into said two large lateral faces (20).

6. A loading and unloading device according to claim 5, characterized in that said base (10) includes two transversal passages (42) that each lead into said two large lateral faces (18) through respective general rectangular openings (44).

7. A loading and unloading device according to claim 1, characterized in that said base (10) includes at least one recess (46) formed respectively in one of said lateral faces (18, 20) so as to enable a fastening strap (48) to pass.

8. A loading and unloading device according to claim 7, characterized in that said recess (46) leads upward into said peripheral border (14) and downward into an attachment hole (52, 54) of said corresponding lateral face (18, 20), arranged to receive a hook of the fastening strap (48).

9. A loading and unloading device according to claim 8, characterized in that said recess (46) has a flared shape from said attachment hole (52, 54) of said lateral face (18, 20) in the direction of said peripheral border (14).

10. A loading and unloading device according to claim 1, further comprising a continuous peripheral groove (56; 92) formed on said lateral faces (18, 20) below said peripheral border (14).

11. A loading and unloading device according to claim 10, characterized in that said continuous peripheral groove (56; 92) forms, on each of said lateral faces (18, 20), a recess for receiving a link rod (54; 94) connected to fastening straps (70).

12. A loading and unloading device according to claim 11, characterized in that said continuous peripheral groove (56; 92) forms a holding recess for the link rod (54; 94) when the fastening straps (70) are under tension.

13. A loading and unloading device according to claim 1, characterized in that said hook is arranged in a recess (80) provided in an end foot (74) of said base (10).

14. A loading and unloading device according to claim 1, characterized in that said pivot pin (78; 88) has at least one end lever (84; 90) capable of being actuated so as to move said locking member (76; 86) from one to the other of the retracted position and the extended position.

15. A loading and unloading device according to claim 1, characterized in that said base (10) is formed in one piece by molding a plastic material.

16. A loading and unloading device according to claim 1, characterized in that said base (10) has a general rectangle shape with dimensions of around 600 mm×400 mm.

17. A loading and unloading device according to claim 1, characterized in that the said base (10) has a height of around 150 mm.

\* \* \* \* \*